L. & F. NAIR.
COVER FOR TRAPS AND CLEAN-OUTS FOR SOIL PIPES.
APPLICATION FILED SEPT. 2, 1910.
986,847.
Patented Mar. 14, 1911.
2 SHEETS—SHEET 2.
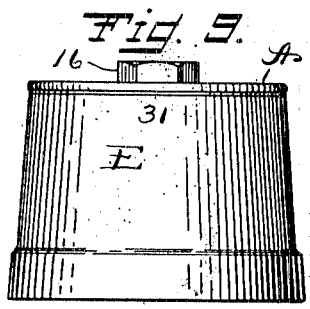
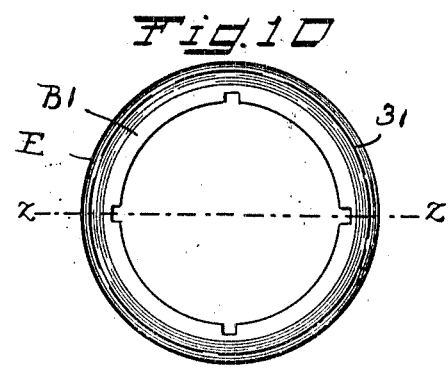
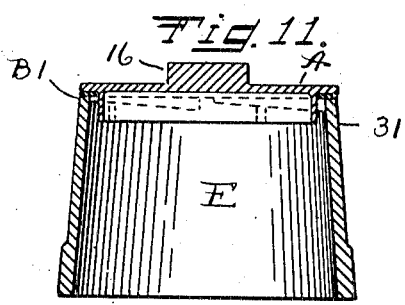
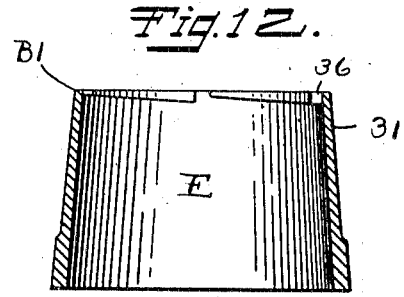
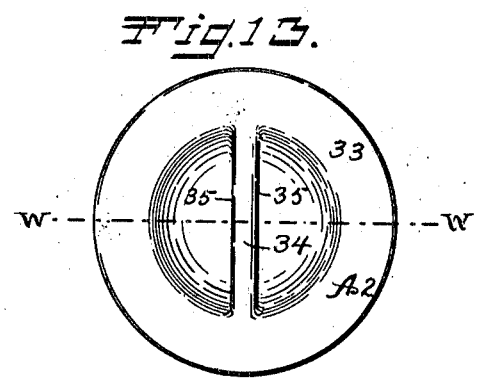
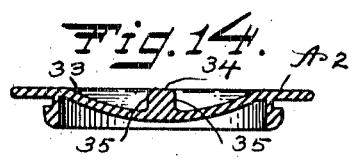
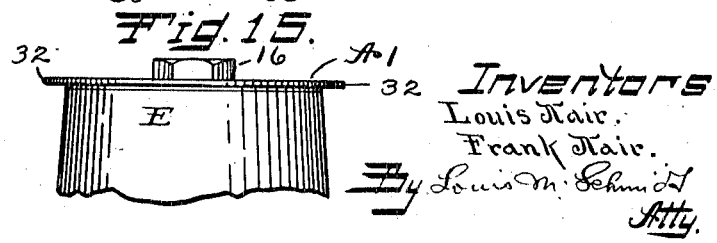
Witnesses:
S. H. Clarke
N. L. Lockwood
Inventors
Louis Nair
Frank Nair
By Louis M. Schmidt
Atty.

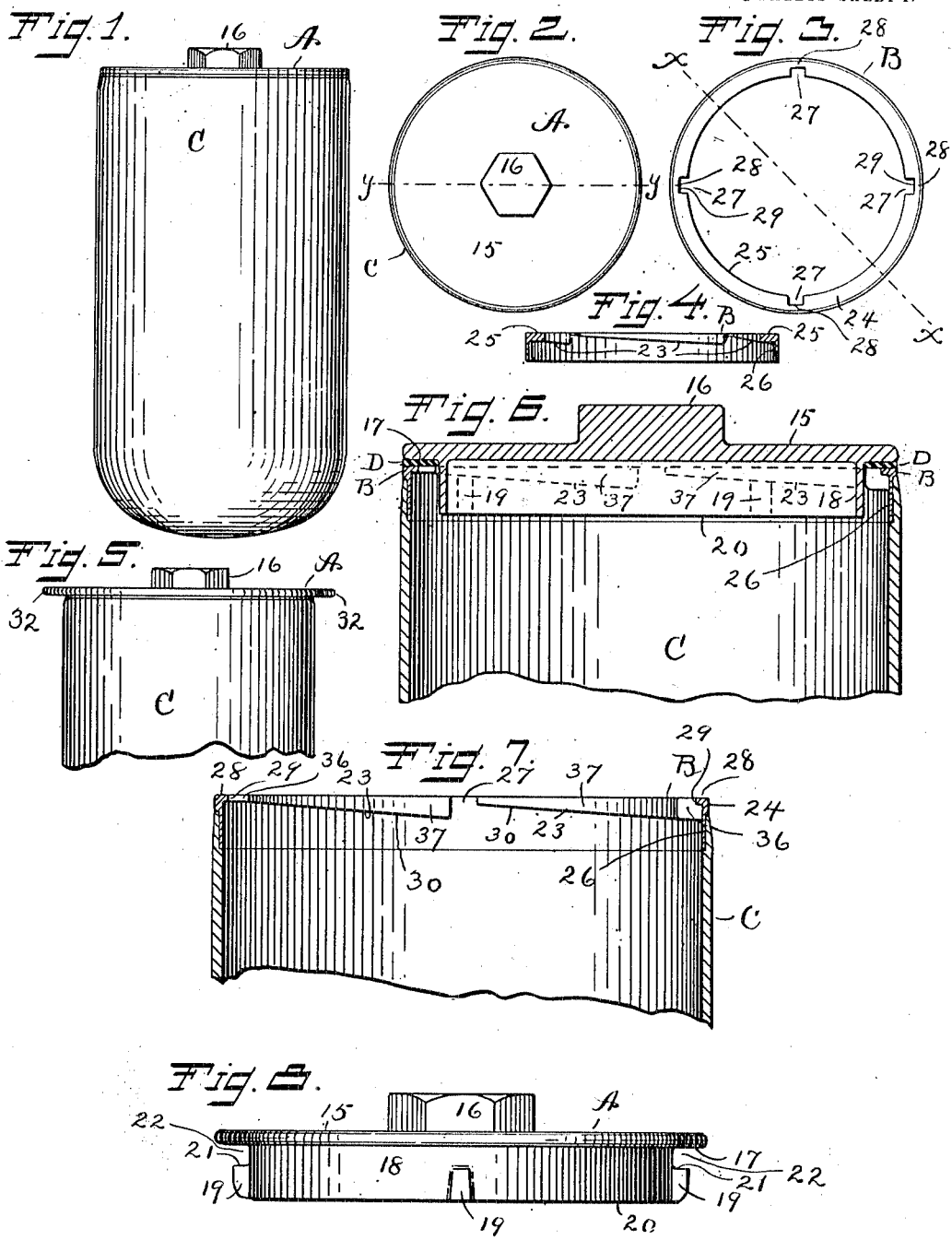

UNITED STATES PATENT OFFICE.

LOUIS NAIR AND FRANK NAIR, OF NEW BRITAIN, CONNECTICUT.

COVER FOR TRAPS AND CLEAN-OUTS FOR SOIL-PIPES.

986,847.	Specification of Letters Patent.	Patented Mar. 14, 1911.

Application filed September 2, 1910. Serial No. 580,244.

*To all whom it may concern:*

Be it known that we, LOUIS NAIR, a citizen of Russia, and FRANK NAIR, a citizen of the United States, both residing at New Britain, in the county of Hartford and State of Connecticut, have invented certain new and useful Improvements in Covers for Traps and Clean-Outs for Soil-Pipes, of which the following is a specification.
Our invention relates to improvements in covers for traps and clean outs for soil pipes and the objects of our improvements are simplicity and economy in construction and convenience and efficiency in use.
In the accompanying drawings:—Figure 1 is a side elevation of a trap provided with our improved cover. Fig. 2 is a plan view of the same. Fig. 3 is a similar view of the ring top. Fig. 4 is a sectional view of the same on the line *x x* of Fig. 3. Fig. 5 is a side elevation of part of a trap provided with a cover like that shown in Fig. 15. Fig. 6 is a sectional view on the line *y y* of Fig. 2 on an enlarged scale, the trap being in part broken away. Fig. 7 is a similar view, with the cover removed. Fig. 8 is a side elevation of the cover. Fig. 9 is a side elevation of a clean out provided with our cover, on the same scale as Fig. 1. Fig. 10 is a plan view of the same with the cover removed. Fig. 11 is a sectional view of the parts shown in Fig. 9, on the line *z z* of Fig. 10. Fig. 12 is a similar view with the cover removed. Fig. 13 is a plan view of a modification of our cover. Fig. 14 is a sectional view of the same on the line *w w* of Fig. 13. Fig. 15 is a view similar to that shown in Fig. 9, in part broken out, showing another modification of the cover.
A is the cover for a trap or clean out and B is a ring top to a trap suitable for receiving the same and as shown is secured in place on the top of the body of a trap C of ordinary construction by a wiped joint. The said cover A comprises a generally flat and circular body 15 having on the upper side and centrally located a hexagonal head 16 suitable for receiving a wrench and on the lower side an annular outer rim 17 that is flat and forms a seat suitable for receiving a packing washer D. Inwardly from the said rim 17 there is a downwardly projecting cylindrical neck or shell 18 of appreciable depth provided on the outer periphery as shown with four outwardly radially projecting lugs 19 spaced 90 degrees apart which extend upwardly from the lower edge 20 of the shell 18 and are provided at their upper ends with horizontal radial engaging edges 21, which are separated from the annular outer rim 17 by a space 22 suitable for engaging with a set of inclined ways 23 provided therefor on the ring top B.

The ring top B comprises an open cylindrical body 24 having the top extended inwardly in the form of a flange 25 so as to form a seat for the packing washer D, and is provided integral with the flange 25 and the inner wall 26 of the body 24 with the ways 23, which latter are four in number to correspond with the number of lugs 19.

The flange 25 is provided on the inner edge with radial recesses 27, corresponding to the said lugs 19, which enter part way into the same to leave a seat 28 for the packing washer D and are of sufficient depth that the lugs 19 will be admitted between the back edges 29 so that the cover A may be dropped into position on the ring top B and the lugs 19 be engaged with the ways 23.

The ways 23 constitute the bottom surfaces of downwardly projecting ribs 37 integral with the flange 25 and the inner wall 26, and are inclined relatively to the flange 25, and follow a helical path, being essentially interrupted screw threads and they extend continuously from one recess 27 to the next one, as shown extending essentially 90 degrees. The lower surfaces 30 of the ways 23 follow a helical course from one recess 27 to the next one, so that the lugs 19 will engage therewith by means of the bearing edges 21 when the cover A is turned, and thereby clamp the packing washer D between the seats 17 and 25 provided therefor on the cover and top ring respectively.

Fig. 9, shows a clean out E provided with our cover A and in which the ring top B¹ is integral with the body 31 of the same.

In Fig. 15 a clean out E is shown in which the cover A¹ is provided with an overhanging flange 32.

In the modification of the cover A² shown in Fig. 14 the top 33 is flush and is provided with a central depression which is bridged by a bridge or dam 34 having parallel sides 35 suitable for receiving the engaging jaws of a monkey wrench so as to be turned thereby.

As described our top or cover is suitable for being removably held in place on the ring top by a wedging or screw pressure and is readily removable and replaceable. In removing the cover the back edges 36 of the wedge shaped ribs 37 form back stops for the lugs 19 and serve to guide the same in removing the cover from the ring top.

The flange on the cover shown in Figs. 5 and 15 serves conveniently as a handle for turning the cover on and off and is sufficient in most cases for the purpose so that the use of a wrench may not be necessary.

It is understood that in some cases the packing washer D may be dispensed with and the seats 17 and 25 brought directly together. In such case the method of connection of the ring top described is well suited to bring the two surfaces together to make a tight joint, notwithstanding slight variations in alinement of the locking devices relatively to the sealing surfaces.

It is apparent that some changes from the specific construction herein disclosed may be made and therefore we do not wish to be understood as limiting ourselves to the precise form of construction shown and described, but desire the liberty to make such changes, in working our invention, as may fairly come within the spirit and scope of the same.

We claim as our invention:—

In a trap or clean out having a ring top and a cover, the said ring top provided at the upper end and circumferentially with an inwardly projecting flange having a multiple of inclined ways on the under side separated by spaces, the said cover provided with a packing seat and with lugs suitable for being admitted through the said spaces to engage with the said ways, the said spaces comprising radial recesses 27 in the said flange, the diametrical spread of the said recesses being such as to provide a seat 28 for a packing ring outside thereof.

LOUIS NAIR.
FRANK NAIR.

Witnesses:
SHEFFIELD H. CLARKE,
NEWTON L. LOCKWOOD.